US008477246B2

(12) United States Patent
Saxena et al.

(10) Patent No.: US 8,477,246 B2
(45) Date of Patent: Jul. 2, 2013

(54) SYSTEMS, METHODS AND DEVICES FOR AUGMENTING VIDEO CONTENT

(75) Inventors: Ashutosh Saxena, Redwood City, CA (US); Siddharth Batra, Stanford, CA (US); Andrew Y. Ng, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 965 days.

(21) Appl. No.: 12/500,416

(22) Filed: Jul. 9, 2009

(65) Prior Publication Data

US 2010/0067865 A1 Mar. 18, 2010

Related U.S. Application Data

(60) Provisional application No. 61/134,935, filed on Jul. 11, 2008.

(51) Int. Cl.
*H04N 5/272* (2006.01)

(52) U.S. Cl.
USPC .......................................... 348/586; 345/632

(58) Field of Classification Search
USPC ........... 386/280; 348/578, 584, 586; 345/630, 345/632, 634, 637, 645
See application file for complete search history.

(56) References Cited

U.S. PATENT DOCUMENTS

| | | | | |
|---|---|---|---|---|
| 5,436,672 A | * | 7/1995 | Medioni et al. | 348/591 |
| 5,488,675 A | * | 1/1996 | Hanna | 382/284 |
| 5,566,251 A | * | 10/1996 | Hanna et al. | 382/284 |
| 5,731,846 A | * | 3/1998 | Kreitman et al. | 348/581 |
| 5,751,838 A | * | 5/1998 | Cox et al. | 382/107 |
| 5,808,695 A | * | 9/1998 | Rosser et al. | 348/584 |
| 5,917,553 A | * | 6/1999 | Honey et al. | 348/578 |
| 6,122,013 A | * | 9/2000 | Tamir et al. | 348/587 |
| 6,124,864 A | * | 9/2000 | Madden et al. | 345/473 |
| 6,157,747 A | * | 12/2000 | Szeliski et al. | 382/284 |
| 6,181,345 B1 | * | 1/2001 | Richard | 345/419 |
| 6,208,386 B1 | * | 3/2001 | Wilf et al. | 348/578 |
| 6,522,787 B1 | * | 2/2003 | Kumar et al. | 382/268 |

(Continued)

FOREIGN PATENT DOCUMENTS

| | | | |
|---|---|---|---|
| WO | WO 97/35517 | * | 1/1997 |
| WO | WO 2008/143523 | * | 11/2008 |

OTHER PUBLICATIONS

2007, Saxena et al. "Learning 3-D Scene Structure from a Single Still Image." ICCV Workshop on 3D Representation for Recognition, ICCV (2007), 8 pgs.

(Continued)

*Primary Examiner* — David Harvey
(74) *Attorney, Agent, or Firm* — Crawford Maunu PLLC

(57) ABSTRACT

Methods, systems, products and devices are implemented for editing video image frames. According to one such method, image content is embedded into video. A selection input is received for a candidate location in a video frame of the video. The candidate location is traced in subsequent video frames of the video by approximating three-dimensional camera motion between two frames using a model that compensates for camera rotations, camera translations and zooming, and by optimizing the approximation using statistical modeling of three-dimensional camera motion between video frames. Image content is embedded in the candidate location in the subsequent video frames of the video based upon the tracking thereof.

21 Claims, 8 Drawing Sheets

U.S. PATENT DOCUMENTS

| | | | | |
|---|---|---|---|---|
| 6,611,266 | B1 * | 8/2003 | Pollack et al. | 345/427 |
| 7,230,653 | B1 * | 6/2007 | Overton et al. | 348/584 |
| 7,689,062 | B2 * | 3/2010 | Baharav et al. | 382/282 |
| 2004/0075663 | A1 * | 4/2004 | Plante | 345/474 |
| 2004/0165776 | A1 * | 8/2004 | Brouwer | 382/181 |
| 2005/0001852 | A1 * | 1/2005 | Dengler et al. | 345/633 |
| 2007/0058717 | A1 * | 3/2007 | Chosak et al. | 375/240.08 |
| 2008/0137989 | A1 | 6/2008 | Saxena et al. | |
| 2009/0315978 | A1 * | 12/2009 | Wurmlin et al. | 348/43 |

OTHER PUBLICATIONS

2004, Reinhard et al. "Real-time color blending of rendered and captured video." Proc. Of I/ITSEC, Paper No. 1502 (2004), pp. 1-9.

2008, Stober. "Extreme makeover: computer science edition." Stanford Report online (Nov. 2008), 2 pgs.

2008, Saxena et al. "Automatically Augmenting Videos with Virtual Content." Submitted as an Appendix to the underlying U.S. Appl. No. 61/134,935.

1998, Jordan, Editor. *Learning in Graphical Models, Abstract and Table of Contents Only* (2 pgs). MIT Press, Nov. 1998.

* cited by examiner

SYSTEMS, METHODS AND DEVICES FOR AUGMENTING VIDEO CONTENT

RELATED PATENT DOCUMENTS

This patent document claims the benefit, under 35 U.S.C. §119(e), of U.S. Provisional Patent Application Ser. No. 61/134,935 filed on Jul. 11, 2008 and entitled "Automatic Video Augmentation with Virtual Content;" this patent document and the Appendix filed in the underlying provisional application are fully incorporated herein by reference.

FIELD OF THE INVENTION

The present invention relates to automated image modification and more particularly to embedding image content into video image sequences.

BACKGROUND

Video editing is often performed by skilled personnel using expensive video editing software. It often requires significant time and effort, including reviewing and editing the many frames of the video.

Advances in camera and rendering technology have made it feasible to augment live video footage such as sports broadcasts, with virtual content, such as advertisements, or virtual content enabling tactical analysis. To generate a composite video with both the real and the virtual footage, knowledge of the scene structure and camera position/orientation is necessary. Some systems approach this challenge by engineering the recording conditions (i.e., hardware camera trackers in the tripods) and handcrafting the scene models. Overall this is a tedious, expensive and time-consuming process—and has questionable results unless certain controlled conditions are met.

Unfortunately, the required level of instrumentation makes such augmentation technology unusable for video footage recorded under more general conditions. Many existing solutions still require a fair amount of manual intervention and do not enable easy handling of difficult situations in general scenes, such as occlusion.

These and other challenges remain unsolved and, in some instances, unrecognized. The ability to automatically embed content in an efficient and flexible manner opens the door for a variety surprising applications and results.

SUMMARY

The present invention is directed to adding image content to video. These and other aspects of the present invention are exemplified in a number of illustrated implementations and applications, some of which are shown in the figures and characterized in the claims section that follows. Embodiments of the present invention involve the transformation of data into a particular visual depiction of physical objects and facilitate or include the display thereof.

Consistent with an embodiment of the present invention, a fast and easy-to-use approach to video augmentation is provided that operates with little or no manual interaction. For instance, a user only needs to draw an approximate rectangle in one of the frames where the content would be embedded. Input to the approach includes a video image sequence without special tracking hardware used to capture the images or poses restrictions on the range of allowable camera motion. The approach can be used to place static or video content (such as advertisements) into pre-existing videos such as feature films, TV broadcasts or private home videos that were posted on community web platforms. Machine learning is used and robustness and flexibility is provided due to minimum use of explicit 3D geometry reconstruction. The augmented footage can correctly handle occlusions by foreground objects and explicitly adjust the virtual content to match the local appearance and lighting of a real scene.

Embodiments of the present invention can handle a wide range of camera motions including arbitrary rotations, zooms and translations. Aspects relate to handling of occlusions and sophisticated appearance adjustments by assimilating local lighting of real and virtual scene content.

In an embodiment of the present invention, advertising content is embedded in a video. The advertising content can include an image, a logo, text, a video clip, a three-dimensional object, or any combination thereof. Aspects of the present invention can be used for augmenting virtually any type of video footage including, but not limited to, videos, online videos, movies, feature-length films, television shows, home videos, online clips, etc.

According to another aspect of the present invention, a method is implemented for generating video with embedding image content. A processor system receives a selection input for a candidate location in a video frame of the video. The candidate location is tracked in subsequent video frames of the video by approximating three-dimensional camera motion between two frames using a model that compensates for camera rotations, camera translations and zooming, and optimizing the approximation using statistical modeling of three-dimensional camera motion between video frames. Image content is then embedded in the candidate location in the subsequent video frames of the video based upon the tracking thereof.

Embodiments of the present invention involve an electronic circuit configured and arranged to receive a selection input for a candidate location in a first video frame of the video and to track the candidate location in subsequent video frames of the video. Tracking is accomplished by approximating three-dimensional camera motion between two frames, and optimizing the approximation using statistical modeling of three-dimensional camera motion between video frames. The circuit embeds the image content in the candidate location in the subsequent video frames of the video.

Consistent with another embodiment of the present invention, a computer product is implemented that includes computer readable medium storing instructions that when executed perform various steps. The steps include receiving a selection input for a candidate location in a video frame of the video and tracking the candidate location in subsequent video frames of the video. The tracking is performed by approximating three-dimensional camera motion between two frames using a model that compensates for camera rotations, camera translations and zooming, and optimizing the approximation using statistical modeling of three-dimensional camera motion between video frames. The performed steps also include embedding image content in the candidate location in the subsequent video frames of the video based upon the tracking thereof.

The above summary is limited to characterizing certain aspects and is not intended to describe each illustrated embodiment or every implementation of the present invention. The figures and detailed description that follow, including that described in the appended claims, more particularly exemplify these embodiments.

BRIEF DESCRIPTION OF THE DRAWINGS

The invention may be more completely understood in consideration of the detailed description of various embodiments of the invention that follows in connection with the accompanying drawings as follows.

Figure 1:
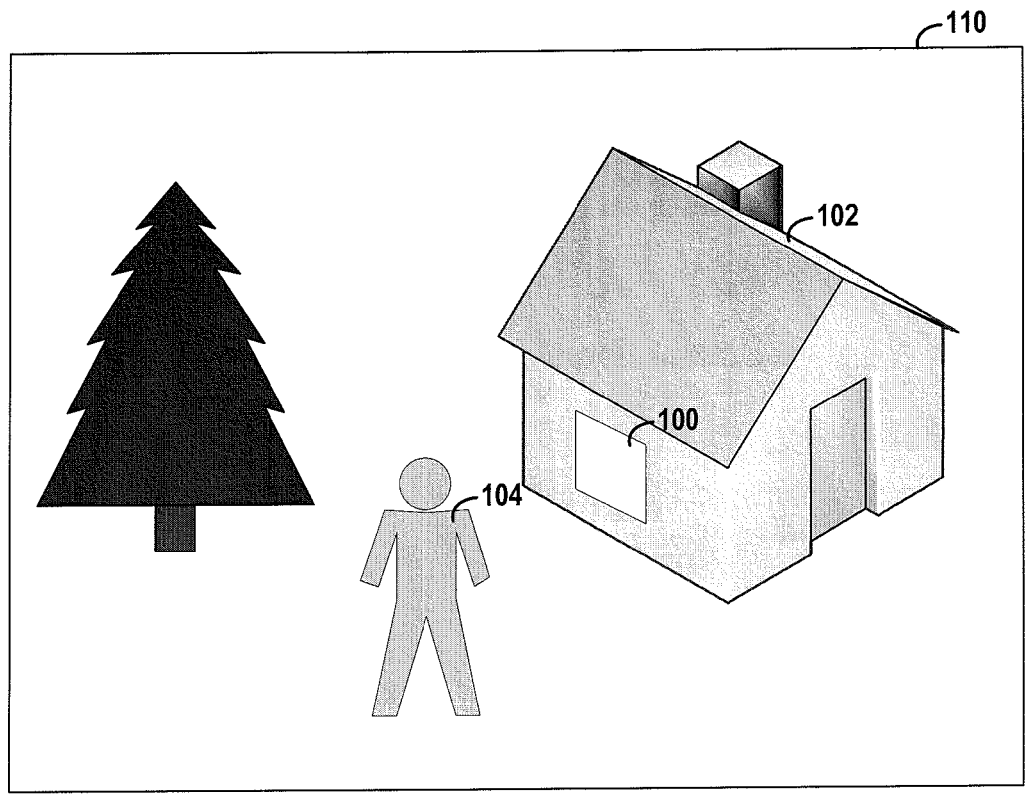
FIG. 1 depicts two image frames representing consecutive images in a video sequence, consistent with an embodiment of the present invention.
Figure 1:
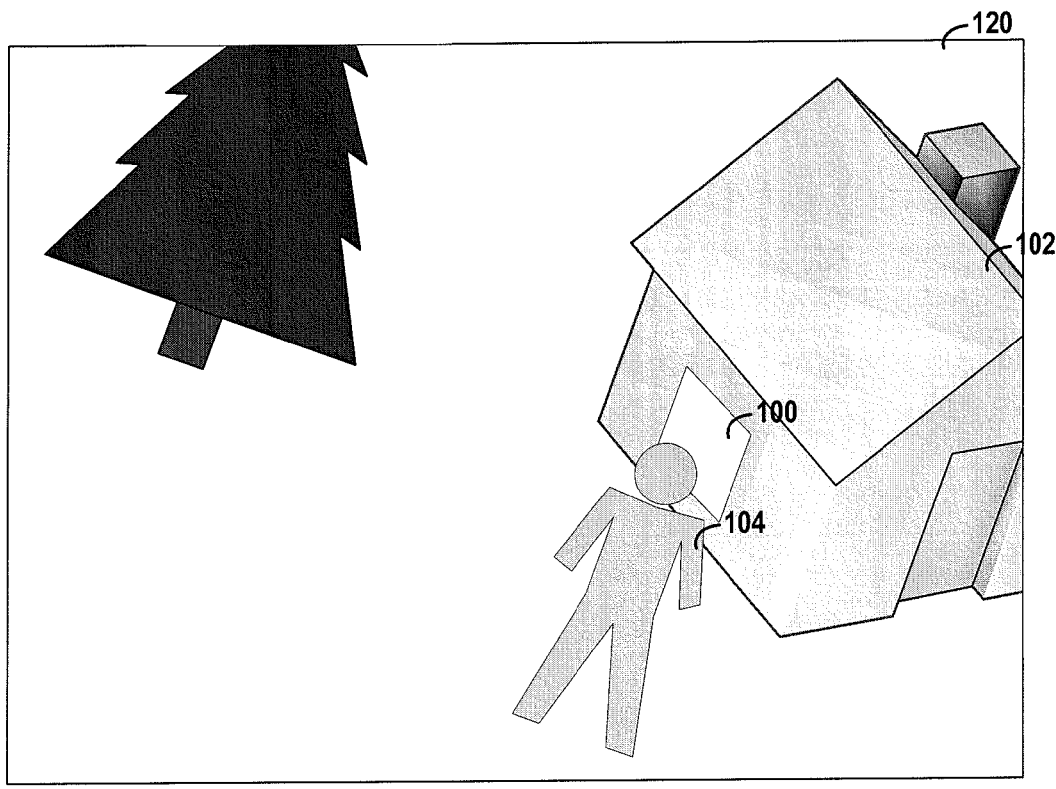

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for embedding visual content within a video image sequence. While the present invention is not necessarily limited to such applications, various aspects of the invention may be appreciated through a discussion of various examples using this context.

According to an embodiment of the present invention, a method is used to embed visual content into a video image sequence. The method involves constructing a model of an identified region across images of the video image sequence. The model includes representations of occlusions of the identified region. The model considers projective transformations caused by movements of the camera. These projective transformations are used to accurately track the identified region between image frames. A projective transformation is a transformation relating to the composition of a pair of perspective projections. They describe what happens to the perceived positions of observed objects when the point of view of the observer changes through the preservation of incidence and cross-ratio.

Consistent with an embodiment of the present invention, a method is implemented for generating video with embedding image content. The method can be implemented by a processor executing computer software. The processor receives a selection input for a candidate location in a video frame of the video. The processor tracks the candidate location in subsequent video frames of the video. The tracking is accomplished by approximating three-dimensional camera motion between two frames using a model that compensates for camera rotations, camera translations and zooming. The processor optimizes this approximation using statistical modeling of three-dimensional camera motion between video frames. The processor places image content in the candidate location in the subsequent video frames of the video at the tracked location.

More specific embodiments of the present invention involve the use of a Bayesian networking learning technique to model temporal dependent aspects. The learning technique can be structured to account for the current image, a modeling of a source region for placement of embedded content and an occlusion mask. To determine a transformation between consecutive frames, the learning technique is seeded or initialized with an approximate transformation. This approximation is then optimized to arrive at the final transformation and resulting modeling.

Aspects of the present invention relate to a user interface that allows a user to select a source region. The interface displays an image frame from the video and allows a user to interactively select a region for placement of image content. For instance, the source region could be implemented as a rectangle, requiring the user to specify the bounds of the rectangle as defined by the four sides or corners. Certain implementations require only that the user specify a general area. Automated algorithms, such as machine learning algorithms, determine the bounds of a source region from a single point selected by the user. One such algorithm estimates the three-dimensional structure indicated by the user selection, determines a proper perspective for the structure and then generates a suitable source region for the desired image content to be embedded.

In particular embodiments, the user only need define the source region in a single frame. Of course, the interface could allow the user to define or redefine the source region in multiple frames if so desired. For instance, the user could redefine the source region every N frames, in response to low-confidence level for transformation of the algorithm (e.g., judged as a function of difference between initialized transformation and final-optimized transformation), or responsive to a user selection. The algorithm can then determine the location for the source region for the frames that remain undefined.

The embedded image content can take a variety of different forms. The relatively modular nature of the different aspects of embedding is particularly well suited for flexibility in image content. For instance, the determination of the transformation can be implemented to define the source region, but without specific knowledge of the image content. In what can be considered a rather basic form, the embedded image is a single image with easily defined boundaries (e.g., rectangular or circular). For example, a JPEG file, or similar image file, can be used as the source of the image content. Alternatively, the embedded image content includes multiple images that change over time or even video image sequences.

Turning now to the figures, FIG. 1 depicts two image frames 110 and 120 representing consecutive images in a video sequence, consistent with an embodiment of the present invention. The source video frames 110 and 120 shown in FIG. 1 have dead spaces (e.g., an empty wall), which are called a "source region." These source regions are well-suited for embedding an image or a video (e.g., an advertisement), which are called "content," or "image content." Aspects of the present invention consider a number of things to ensure that the new image/video becomes a "part" of the scene, as compared to looking artificially pasted on the video. A first aspect relates to the need for the content to be pasted in the same physical place across consecutive frames. A second aspect is directed toward the need for the content to satisfy occlusions, i.e., consider objects and visible effects that come in between the camera and the surface. A third is that the content needs to be placed in a correct perspective, e.g., consistent with the orientation of the surface where the content is located. Other aspects relate to blend-in of the content in the source video in a way that respects the color/tone and lighting of the source video.

Source region 100 represents the desired location for embedding image content. In image frame 110, the source region has a particular shape that can be correlated to an orientation of the camera capturing the image. In this particular example, the source region is placed upon structure 102, shown as a house. Image content is added at the source location.

Image 120 represents an image that is temporally displaced from image 110. Image 120 is also spatially displaced from image 110 in terms of relative location of the camera and source region 100. Embodiments of the invention are particularly useful in that they compensate for such spatial displacement regardless of whether the camera moves relative to other structures. In this manner, the relative movement could be caused by actual movement of the camera, movement of the structure associated with the source region or a combination thereof.

Image 110 depicts a situation where there is no occlusion of source region 100. In image 120, however, source region 100 has partial occlusion due to person 104. Aspects of the present invention provide automatic detection of such occlusion and prevent the occluding object from being overwritten by the embedded image. In this manner, objects that are located in front of the source region are preserved in the video images.

Figure 2:
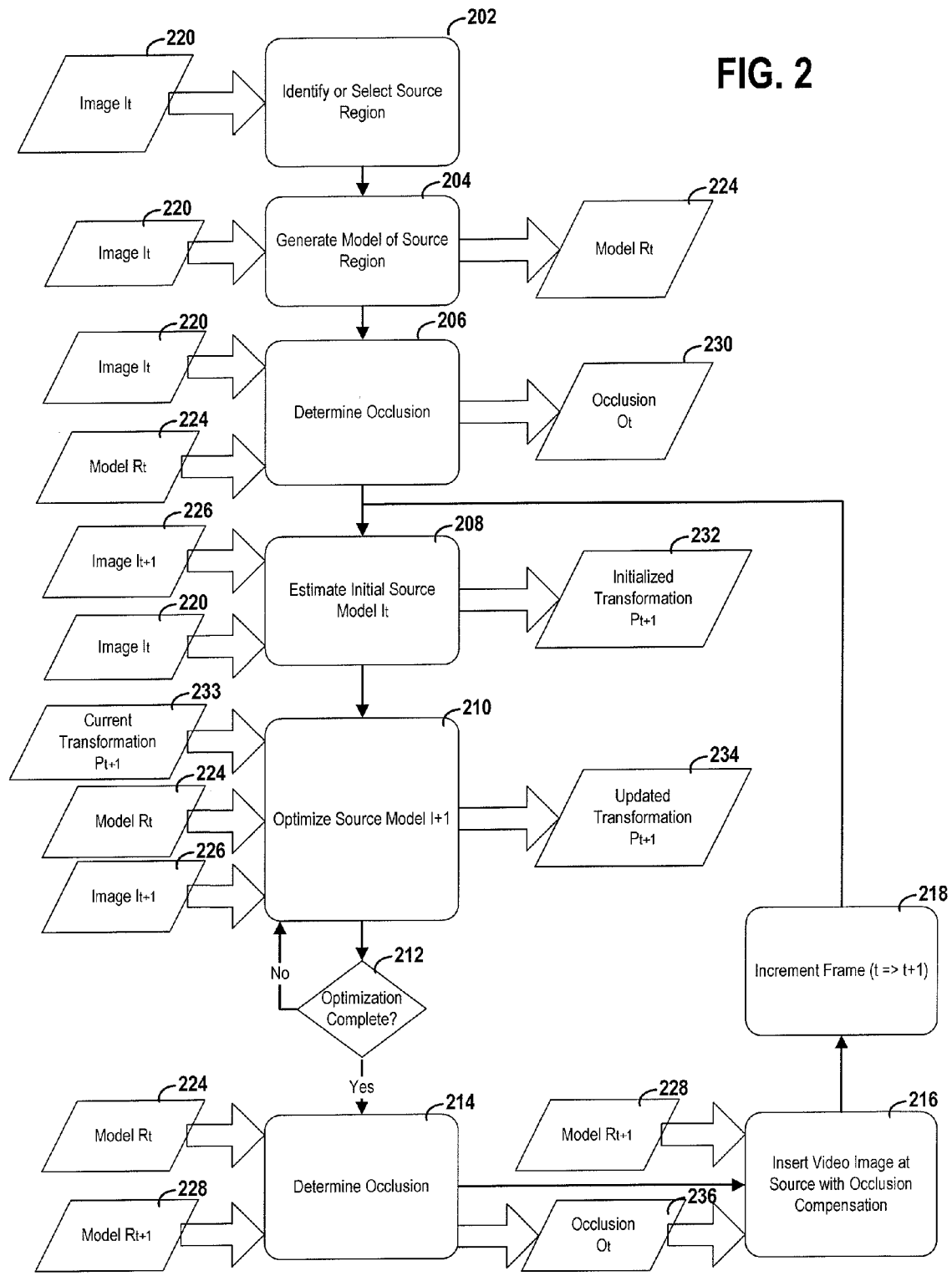
FIG. 2 depicts a flow diagram for embedding image content in a video sequence, according to an embodiment of the present invention.

FIG. 2 depicts a flow diagram for embedding image content in a video sequence, according to an embodiment of the present invention. Embodiments of the present invention automate many of the necessary steps through the use of machine learning algorithm. Generally speaking, the algorithm creates a model of the source region (e.g., an empty wall) across the video frames. This model can also include any of the occlusions in the scene. When going from one frame to the next, the camera movements cause the shape of the region to change under projective transformations. Therefore, the model also considers these projective transformations in order to track the source region from one frame to the next.

The first step 202 represents a mechanism for identification or selection of a source region within the video frames. For manual identification or selection a user interface can be provided to facilitate source region selection by a user viewing an image frame $I_t$ 220. The flexibility and robust nature of the algorithm facilitates use of an interface that is simple and intuitive even for non-expert users who want to edit their personal videos. Moreover, selection of the source region (where new content would be embedded by the algorithm) can be accomplished quickly, e.g., no more than a few seconds. Consistent with these aspects, an embodiment of the present invention allows a user to load a video, click on the desired frame (first frame loaded by default), and then draw on the frame using a mouse or similar input. For instance, a colored pen-tool can be generated on the display screen to allow for the user to identify the desired source region. The user can draw a rectangle on the image by clicking four times on the image. Even an approximate rectangular patch is enough to indicate the perspective in which the content is to be placed. Particular embodiments allow for selection in one frame only.

According to another embodiment of the present invention, the selection process is automated. For instance, an automated algorithm can be used to estimate the orientation of the surface. This can be particularly useful for implementations where the user needs to only click on a surface instead of drawing a rectangle in the frame. Machine learning techniques can be used to estimate the 3D structure of a scene from a single still image thereby providing an estimate of the perspective of the source region. For further details on one such machine learning technique, reference can be made to SAXENA, A., et al; *Learning 3-d scene structure from a single still image*; ICCV Workshop on 3D Representation for Recognition, ICCV (2007), which is fully incorporated herein by reference.

The same (source) region in a frame might appear different in another frame, e.g., because the camera might have moved between the two frames (causing perspective distortion) and because the noise causes the pixel values to fluctuate. Accordingly, during step 204 a model $R_t$ 224 is generated of the source region from an image $I_t$ 220. $I_t$ represents the image observed at frame t=1, 2, . . . , N. $R_t$ represents region modeling the appearance of the source region when there is no occlusion.

Objects and visible effects can interpose themselves between the source region and the camera position causing part of the source region to be obscured or occluded. If such occlusions are not properly handled, the embedded image can improperly obscure foreground objects causing unrealistic and undesirable results. In step 206, an occlusion model $O_t$ 230 is generated based upon the image $I_t$ 220 and the determined model $R_t$ 224.

The algorithm next estimates an approximate transformation 208 between the image $I_t$ 220 and a subsequent image $I_{t+1}$ 226. The transformation function $P_{t+1}$ is initialized according to an approximation $A_{t+1}$ that represents orientation changes in the source region between the image frames and can be used to generate an initial transformation $P_{t+1}$ 232 of the source region. This transformation between the two frames can then be used in the further optimization of the model/transformation (t+1). The initial transformation can be generated by correlating points of correspondence between the images $I_t$ and $I_{t+1}$. To facilitate this initialization, the correlation can be implemented in two-dimensional space. A particular implementation uses scale-invariant feature transform (SIFT) features to provide the correlation. This initialization can be particularly useful for two frames that are far apart or for frames that have moving objects; in these cases, initialization can help the algorithm to be robust to local minima.

Starting from the initialized model/transform, an optimization of the model is performed at step 210. The optimization iteratively updates a current transform $P_{t+1}$ 233 for application to model $R_t$ 224 and image $I_{t+1}$. This updated transform $P_{t+1}$ 234 is used as the current transform $P_{t+1}$ 233 in subsequent optimization steps 210.

Step 212 determines whether to continue optimizing through further iterative optimization steps 210. This determination can be made after finding an optimized value for the model (e.g., finding a minimum of the optimization function), in response to a set number iterations, in response to negligible improvements or other optimization criteria.

Next, occlusions are determined in step 214. The determination of occlusion(s) can be implemented by comparing the source region defined by $R_t$ 224 with the source region defined by $R_{t+1}$ 228 for respective images $I_t$ and $I_{t+1}$. In a particular implementation, an occlusion mask is computed using a weighted distance of pixels in the new frame from the optimized model in the color and intensity space. The weighted distance can then be used to determine whether a pixel should be considered for the occlusion mask. In a particular implementation, a pixel is classified as occlusion if distance is greater than a certain threshold. The occlusion mask can then be modified with image morphological operations, e.g., to remove holes or stray occlusions.

The desired image content is then inserted into the video image frame 216 according to the optimized model $R_{t+1}$ 228 and the resulting occlusion mask $O_{t+1}$ 236. The process then increments the current image 218 and begins processing the next image in the video sequence.

Figure 3:
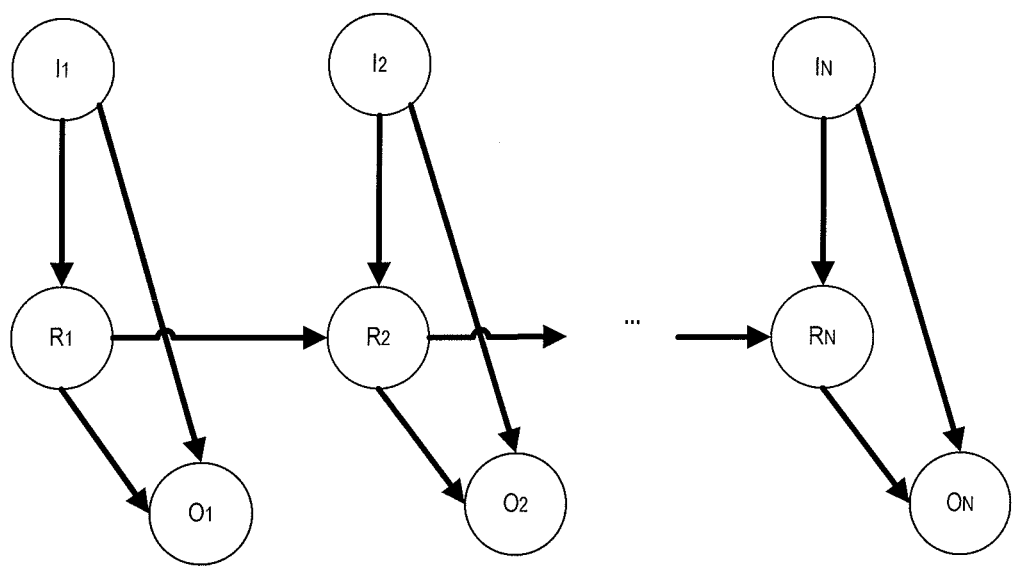
FIG. 3 shows a model for a frame and its dependency on a previous frame, consistent with an embodiment of the present invention.

FIG. 3 shows a model for a frame t+1 and its dependency on previous frame t, consistent with an embodiment of the present invention. The model has three variables. The first variable $I_t$ is the image observed at frame t=1, 2, ..., N. The second variable $R_t$ is a rectangular region modeling the appearance of the source region when there is no occlusion. The third variable $O_t$ models the occlusion masks that the algorithm infers. For convenience, the subscript t is sometimes dropped when discussing a single frame. In certain implementations multi-scale representation is maintained for these variables—higher scale represent coarser resolution (blurred version) and lower scale represent finer resolution.

Informally, the arrows in a temporal Bayesian network models statistical dependency. Thus $R_t$ depends on $I_t$; $R_t$ also depends on $R_{t-1}$, and $O_t$ depends on $R_t$. For further details relating to treatment of Bayesian networks, reference can be made to Jordan, M., *Learning in Graphical Models*, MIT Press (1998), which is fully incorporated herein by reference.

Figure 4:
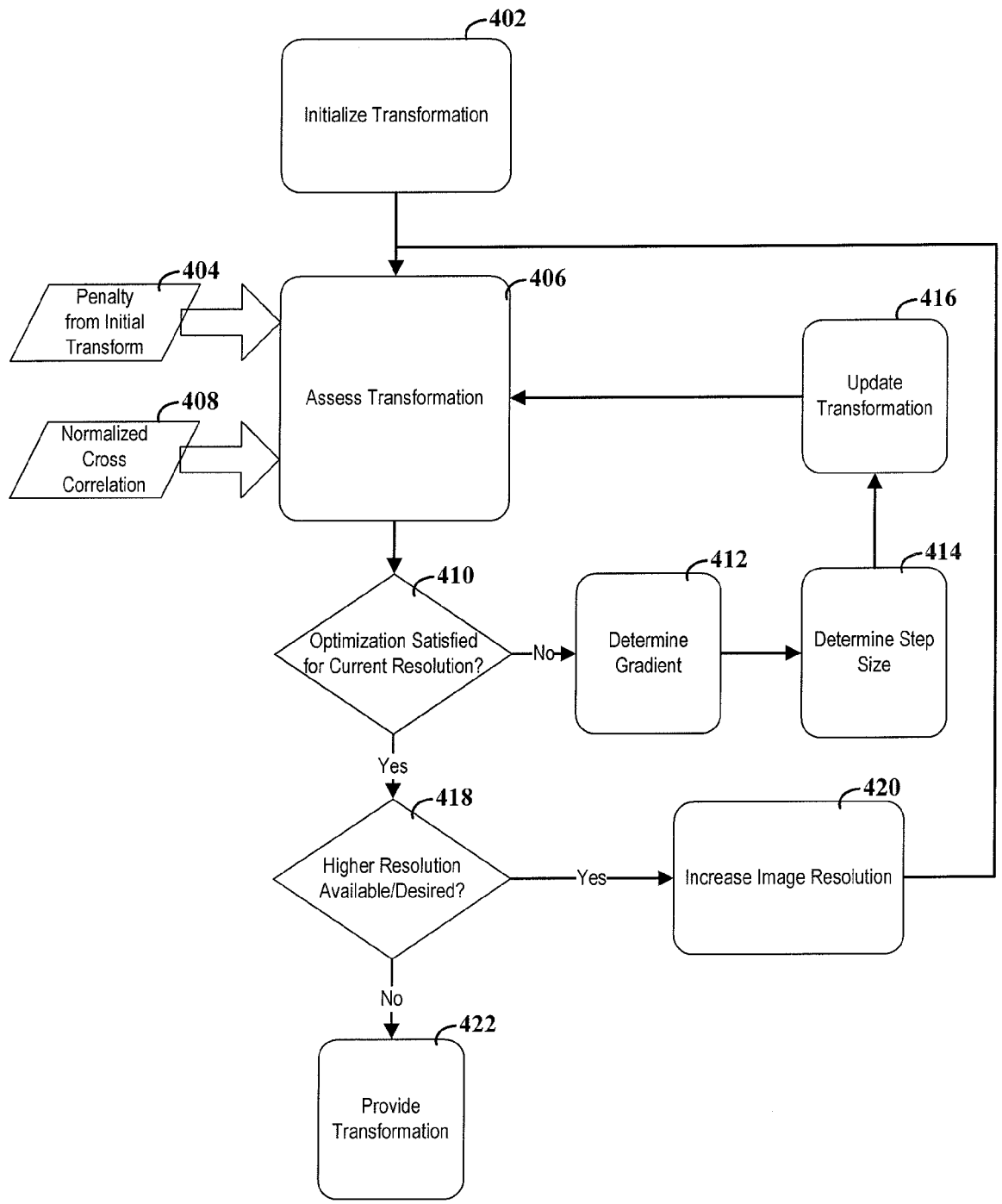
FIG. 4 depicts an algorithm for determining/optimizing a transformation for an image frame, consistent with an embodiment of the present invention.

FIG. 4 depicts an algorithm for determining/optimizing a transformation for an image frame, consistent with an embodiment of the present invention. For a particular implementation, each pixel in $I^s$ (and also in $R^s$), at a scale s, is a 3-vector in RGB space. Noise in the appearance is modeled for each pixel in $R^s$ with a multi-variate Gaussian distribution $R^3 \sim N(\mu, \Sigma)$, where $\mu \in R^3$, $\Sigma \in R^{3 \times 3}$. This mask is used for tracking the pixels from one frame to the next as well as inferring the occlusion masks.

The optimization algorithm provides an estimate for the parameters of the transformation matrix that can represent the projective transformation caused by the camera motions. A homogenous coordinate representation is used for 2D points, i.e., $u_t = (x, y, 1) \in R^3$. A matrix $P \in R^{3 \times 3}$ can be used to transform a point to the next frame as $u_{t+1} = P u_t$. ($u_{t+1}$ is then normalized to make its 3rd component one.) This matrix P can represent the transformations caused by all camera movements (rotation, zooming and translation). The objective function penalizes (404) deviations in the pixel values in frame (t+1) from the corresponding pixel values in frame t. The change in the shape of the region because of camera motion can be modeled as a projective transformation. (Due to the lack of restrictions on the camera movements, the transformation in the region is not estimated via an affine 2D tracking in the video stream.) The inferred P is used to relate the variables in FIG. 3 at time step t to the ones at (t+1).

Step 402 first estimates an approximate transformation A between the two frames. In a specific implementation, approximate transform is estimated by first locating 2D point correspondences between the two frames using SIFT features. As the source region may be unsuitable for use of SIFT features (e.g., due to lack of texture or other definable features), the transformation can be computed for the more than just the source region and/or for the entire image. Let $x_t = (x, y, 1)^T$ represent the homogeneous coordinate representation of a 2D point in the frame t, and $x_{t+1}$ be the corresponding match in frame (t+1). Let $X_t \in R^{3 \times N}$ and $X_{t+1} \in R^{3 \times N}$ be the matrices where a column n has the point for the nth correspondence, with a total of N correspondences. A is then obtained from these matrices as follows:

$$A = X_{t+1} X_t^{-1} \quad (1)$$

This equation minimizes the sum of squared distance between the 2D points in frame t+1 and the 2D points transformed from frame t to t+1.

The transformation is then assessed 406. One mechanism for assessing involves the use of an objective function to solve for an optimization problem. The objection function can include a variety of terms for steering the optimization. A particular objective function includes two terms 404, 408. The first term 404 penalizes the local similarity using a normalized cross correlation metric. The second term 408 is a regularization term that (weakly) prefers $P \in R^{3 \times 3}$ to be close to the initial estimate A. This helps avoid the estimated matrix P* from getting stuck in an (incorrect) local minima.

$$P^* = \underset{D}{\operatorname{argmin}}\, 1 - NCC_P(R_t, I_{t+1}) + \mu \|P - A\|_F^2 \quad (2)$$

where $\mu \in R$ is a small weight assigned to the regularization term, F represents the Frobenius norm, and NCC is the normalized cross correlation defined as $$NCC_P(R_t, I_{t+1}) = \frac{\sum_{x=X_t}(R_t(x) - \bar{R}_t)(I_{t+1}(Px) - \bar{I}_{t+1})}{\sqrt{\sum_{x=X_t}(R_t(x) - \bar{R}_t)^2 \sum_{x=X_t}(I_{t+1}(Px) - \bar{I}_{t+1})^2}} \quad (3)$$

$$\text{where, } \bar{R}_t = \frac{1}{N}\sum_{x=X_t} R_t(x) \text{ and } \bar{I}_{t+1} = \frac{1}{N}\sum_{x=X_t} I_{t+1}(Px).$$

According to a specific implementation, the optimization problem can be solved using Newton's method. For instance, the method first initializes $P:^0 = A$ and for each Newton step k (414), $P:^k$ is updated (416) by computing the gradient 412 and Hessian numerically using subpixel interpolation, and iteration with backtracking line-search. For further details on updating using a backtracking line-search reference can be made to Boyd, S., *Convex Optimization*, Cambridge University Press (2004), which is fully incorporated herein by reference.

Using subpixel interpolation for evaluating the image at a particular location helps our method to track it more precisely. In order to make this method more robust against local minima, which can happen when the local texture is repeated after a few pixels distance, more than just local structure is relied upon. One mechanism for avoiding local minima is to run the optimization over different resolution of the images. Thus, step 410 shows that optimization can be completed first for a current resolution. Once the current resolution is completed, the resolution can be changed (e.g., increased) 420 and optimization can continue 406. Once it is determined that all resolutions have been optimized for 418, the final transform can be provided 422 as an output. In this manner the coarser resolutions help get more of the surrounding structure, and fine resolution helps us achieve sub-pixel level tracking. This technique is also reminiscent of simulated annealing, for which Kirkpatrick, S., et al., *Optimization by simulated annealing, Science* (1983), can be referenced for further details, and which is fully incorporated herein by reference.

Figure 5:
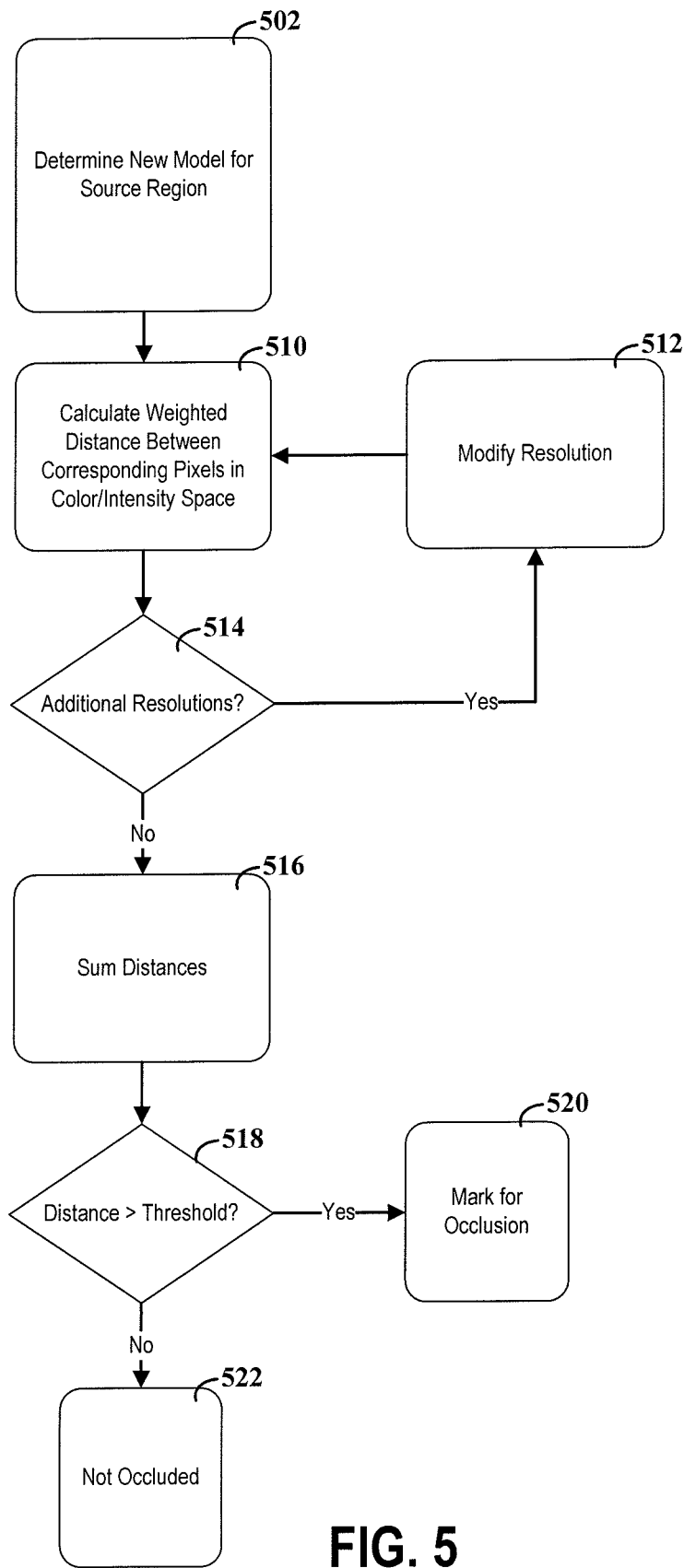
FIG. 5 depicts an algorithm for determining occlusion in an image, consistent with an embodiment of the present invention.

FIG. 5 depicts an algorithm for determining occlusion in an image, consistent with an embodiment of the present invention. In general, a region could have multiple occlusions at any given time during the length of the video. Accordingly, one implementation uses the difference between the model $R_t$ and the new observed frame $I_{t+1}$ to compute the occlusion mask. Given the estimated transform P*, modeling is implemented 502 for the temporal evolution for the model $R_t$ (this corresponds to edge between $R_t$ and $R_{t+1}$ in FIG. 3) as $$R_{t+1}(x)=(1-w)R_t(x)+wI_{t+1}(P^*x) \quad (4)$$

where, $w \in [0,1]$ is a weighting function that combines the old belief with the new observation. For details on similar models, used in various computer vision problems, e.g., background subtraction, reference can be made to Forsyth, D. A. et al., *Computer Vision: A Modern Approach*, Prentice Hall (2003). A smaller value of w can improve the estimate for fast camera motion, fast moving objects or changing lighting conditions better, but sometimes cause oversmoothing. The value of w can be chosen to suit the desired effect. The process begins with $R_0 = I_0$ and then R is computed at each new time step. Although to limiting thereto, the net effect of this is that the model $R_t$ is a weighted average of the unoccluded region over time. This method of combining the belief corresponds to an exponential decay (for $e^b = w/(1-w)$):

$$R_t = \sum_{i=0}^{t-1} e^{bi} I_t(P_{0 \to i} x) \quad (5)$$

To compute the occlusion mask, calculation is performed 510 to determine the weighted distance of the pixel in the new frame $I_{t+1}(Px)$ from the model $R_t(x)$ in hue-saturation-value (HSV) space. This corresponds to computing Mahalnobis distance between the 3-vector $R_t(x)$ and $I_{t+1}(Px)$, because R(x) is modeled as a multi-variate Gaussian.) Further, to make it more robust, this distance can be computed over multiple resolutions 514, 520 of R and I and take the total distance 516.

$$d = \sum_s \| (R_t^s(x) - I_{t+1}^s(P^*x)) \Sigma^{-1/2} \|_2^2 \quad (6)$$

where, $\Sigma \in R^{3 \times 3}$ is an estimate of the covariance matrix. This dependence on R and I represents the edge from R and I to O in FIG. 3. Each pixel can then be classified as occlusion 520 if distance is greater than a certain threshold 518:

$$O_{t+1}(x) = 1, \quad \sqrt{d} > \theta \quad (7)$$
$$= 0, \quad o.w.$$

For example, the threshold $\theta$ is set to be $\theta = 2$, to have occlusion as the pixels beyond two standard deviations away. Pixels less than this threshold are left off of the occlusion mask 522. The occlusion mask can then be cleaned with image morphological operations to remove holes, etc.

The application of the finalized occlusion mask defines the portions of the original image that fall within the two-dimensional area of the source region but are not replaced by the image content. This helps improve the realism of the embedded image; however further image processing can be used for further improvements.

Figure 6:
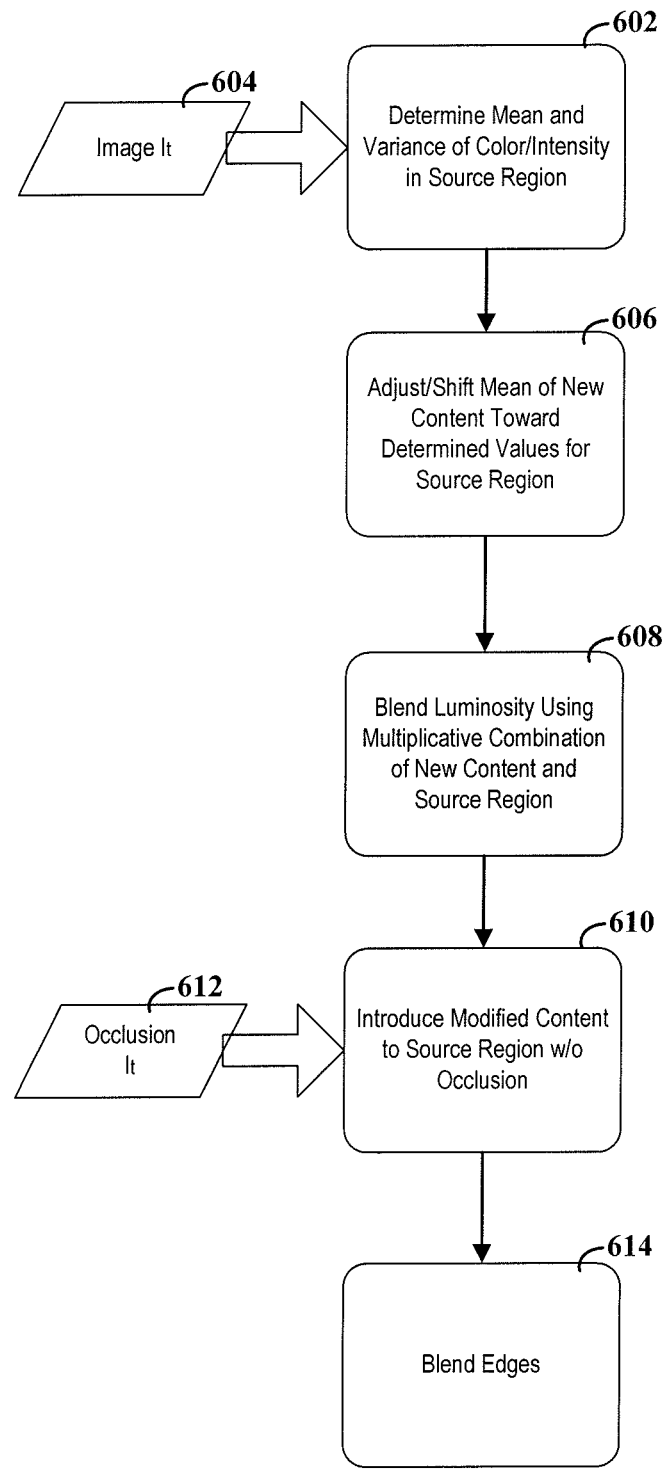
FIG. 6 depicts an example algorithm for further improving the image quality using various rendering techniques, consistent with an embodiment of the present invention.

FIG. 6 depicts an example algorithm for further improving the image quality using various rendering techniques, consistent with an embodiment of the present invention. There are certain requirements for a composited video to look good. To improve image quality, the embedded video is rendered in the scene in a way that it captures the lighting of the scene, the texture of the local surface, and also satisfies occlusions, etc.

Often, the colors, lighting, etc. of the source video and the content differs a lot. For example, the source video might be shot in bright light; therefore, the content would need to be rendered brighter to look a part of the rendered video as compared to avoid the look of being pasted into the video after-the-fact. Similarly, the source region can have partial shadows on it. To improve the realism of the image, the embedded content should match those shadows.

In order to get some of these effects, the mean and variance of the image content is adjusted to match that of the source video. The mean and variance of an image $I_t$ 604 from the source video, is first determined 602. Of particular import is the source region of the image 604. In a specific implementation the mean and variance in the Hue-Saturation-Value (HSV) space can be adjusted 606 using a color blending algorithm. For details on an example real-time color blending algorithm, reference can be made to Reinhard, E., et al., *Real-time color blending of rendered and captured video*, In Proc of I/ITSEC, Orlando (2004). This method shifts the mean of the content video towards the source video, and also matches the variance of each of the channels in the content and the source video. In addition to the global color and illumination properties, it is possible to capture the local shadow-effect and some local surface texture, by performing multiplicative alpha-blending of the value (luminosity) channel 608 as follows: $V_T = V_C^\gamma V_S^{1-\gamma} 1-S$ where $V_C$, $V_S$, $V_T$ is the Value (luminosity) channel of the content, source and target video, respectively.

For rendering, the content image/video is resampled appropriately using subpixel interpolation, and then the pixels in the source video are replaced 610 with the pixels of the adjusted content video (except the pixels that were occluded 612). If desired, a soft blending 614 can be performed at the edges in which the weight given to the content is slowly increased from zero to the desired value based on its distance from the edge.

The specific parameters and algorithms discussed in connection with the above figures and elsewhere herein are not meant to be limiting. Instead a number of variations and modifications are contemplated. For example, additional parameters can be used to initialize and/or optimize the tracking-based modeling of the source area. One such parameter could be the use of information from motion vectors obtained from image file formats such as H.264 or H.263. Motion vectors could be used as a factor in the initialization of the optimization (e.g., by averaging motion vectors to use as an indication of camera motion). Other parameters include the use of future images in addition to past images. For instance, the algorithm can be modified to perform a recursive optimization using the optimized results of future images to adjust the optimization of previous frames. Another algorithm could use two or more user defined source regions. The optimization could be implemented for each of the defined source regions over the same set of image frames. An average of the optimization results or a selection of the best optimization can then be used. This can include optimizations that run in reverse temporal order. For example, a source region selection can be provided both at the beginning and end of the video clip. One optimization traverses from the beginning source region selection to the end of the video clip while the other optimization traverses in reverse order beginning with the end source region and ending at the beginning of the video clip.

Embodiments of the present invention are directed toward Internet applications where one or more of video or image content are provided or accessed using a remote server. The automated nature and relatively low processing requirements are particularly well suited for use in streaming or real-time applications.

Figure 7:
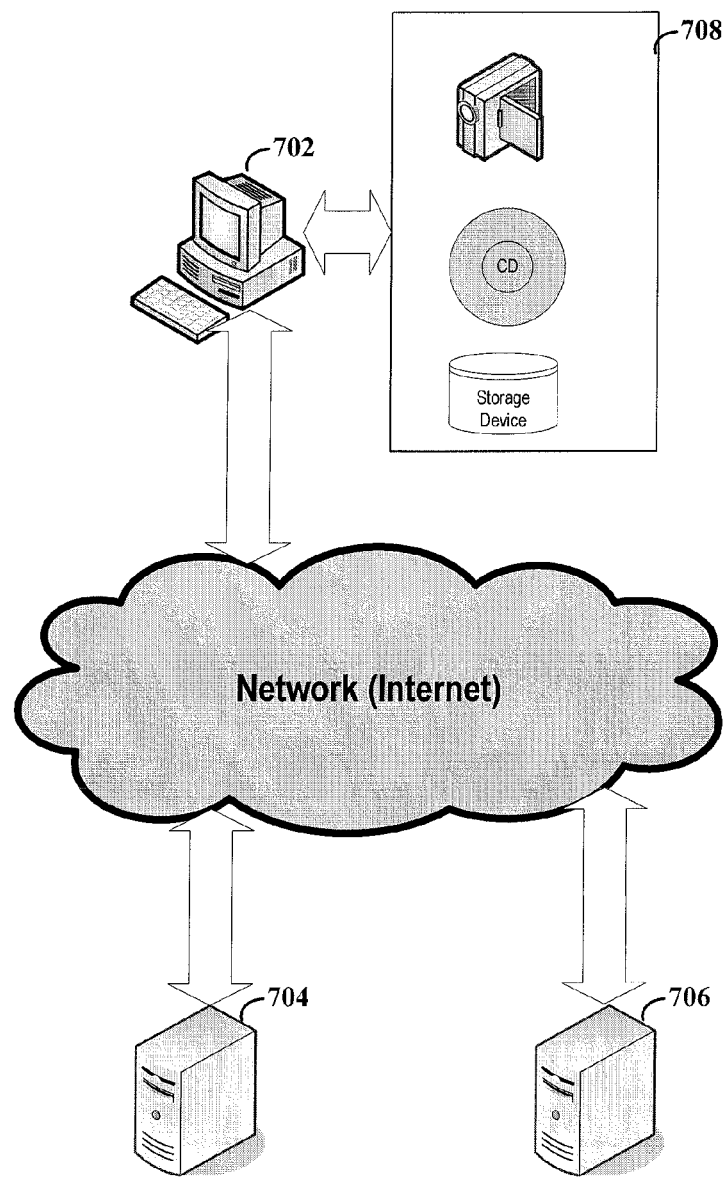
FIG. 7 depicts a computer network arrangement, consistent with an embodiment of the present invention.

According to one such embodiment, the video and image content for embedding can be combined automatically on the client computer. As shown in FIG. 7, the client computer 702 includes a computer readable medium storing instructions that when executed perform one or more of the embedding functions described herein. The robustness of the various aspects of the present invention allow for a variety of configurations and uses in this context. In one configuration, the source of the video and the image content are both stored in a local memory of the client computer 702. In another configuration, one or both of the video and image content can be provided from a remote server 704 or other input device 708 (e.g., video camera, data storage device or compact disk). In particular implementations, the video and image content could be streamed to the client computer, processed and then displayed or retransmitted as desired. For instance, video could be streamed from a first server 704 (e.g., a server operated by a video hosting site), and the advertisement/embedded content could be streamed from a different second server 706 (e.g., a server operated by an ad agency). These two streamed images can then be combined automatically on the client machine. This can be particularly useful for providing flexibility in terms of how the final advertisement is put together and possible ways to run advertising campaigns. For instance, this can allow for targeted advertising using advertisement specifically designed for the particular user.

Figure 8:
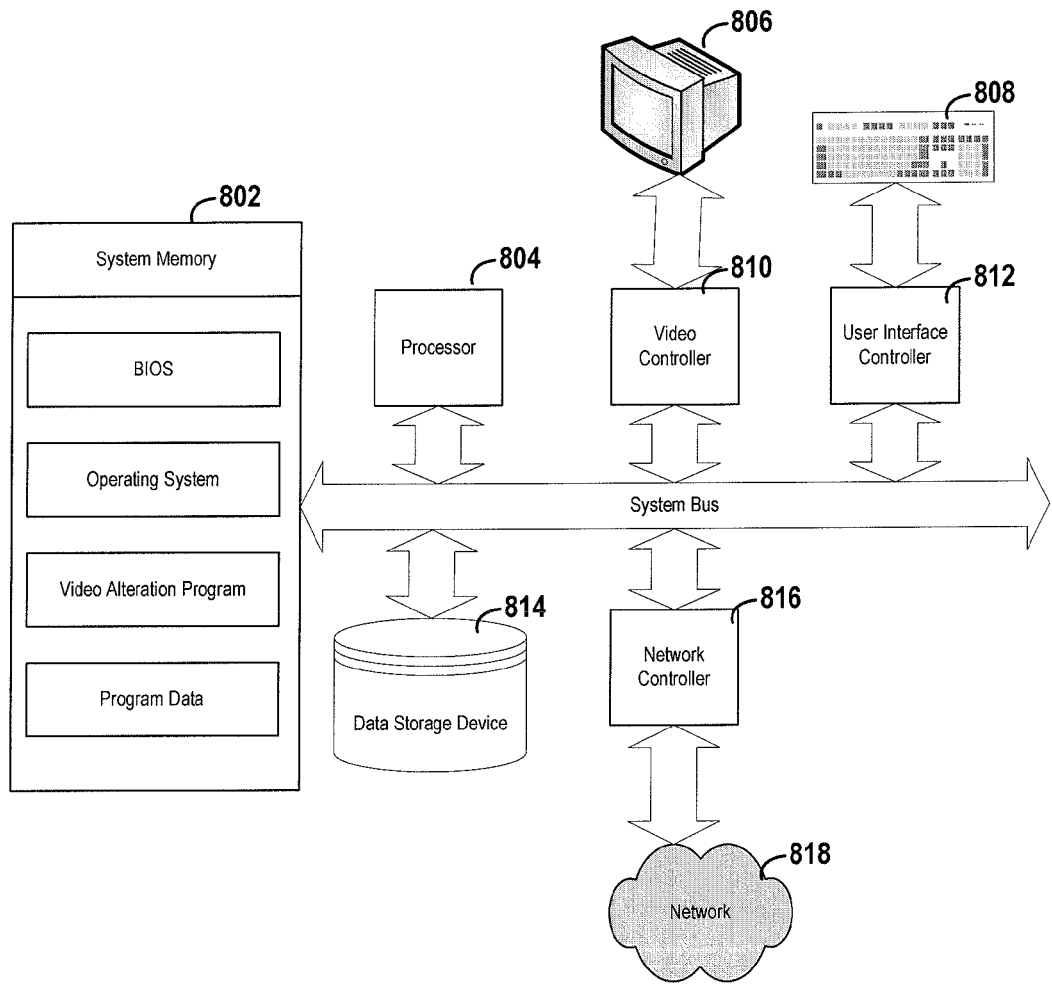
FIG. 8 depicts a computer system for embedding image content into a video sequence, consistent with an embodiment of the present invention.

FIG. 8 depicts a computer system for embedding image content into a video sequence, consistent with an embodiment of the present invention. The computer system includes a processor 804 that accesses a system memory 802 using a system bus. System memory 802 stores software instructions that when executed by processor 804 provide various types of functionality. Example functionality includes, but is not limited to, Basic Input/Output System (BIOS), operating system and various programs/applications. One of the applications includes a video alteration program consistent with aspects of the present invention. These software instructions can also be stored in a non-volatile data storage device 814 (e.g., a hard disc drive). The computer system also includes a video controller 810 for displaying images to a user of the computer system, e.g., using video monitor 806. Network controller 816 provides an interface to a computer network 818, e.g., a local-area-network or a wide-area-network. User input can be received from user interface controller 812. The input can be from a variety of devices (808) including, but not limited to, keyboard, mouse, stylus or touch-screen.

According to other embodiments of the present invention, a method is implemented for tracking whether a user who watched a video later makes a purchase associated with embedded advertising content. In this manner, the purchase can be credited to the embedded advertisement (e.g., for revenue sharing or marketing research purposes). One implementation uses a coupon code provided in connection with the video. In this manner the embedded video advertisement can be presented the user to predispose the user to a subsequent coupon code. Purchases for which a user uses a coupon code associated with the embedded add can be linked back to the embedded video. Other tracking methods include smart cookies or tracking of using other user data (such as credit card info) to identify users that have watched the embedded advertisements to associate them to specific purchases later.

In certain implementations, a website/user interface is provided at the front end to allow users to specify locations for embedded content. The videos can be uploaded by the user or others. This allows for centralized control over the video content and any payment plan associated therewith.

Embodiments of the present invention provide feedback to a user as to the suitability of the selected source region. The system automatically checks the selection and provides a warning to the user if the source region location is likely to result in poor image quality. The algorithm can use a variety of factors, such as the uniformity of the HSV space for the source region (e.g., highly uniform surfaces being less desirable).

Other embodiments of the present invention provide a fully automatic system that allows the user to upload and select of videos as well as clicking on a video to select ad placement locations. The resulting embedded video is then automatically served to people wishing to view the video.

An embodiment of the present invention relates to the ability to handle the addition of three-dimensional objects into a scene. Thus, rather than "pasting" flat image content onto a flat surface or wall, it ca make an object, such as a soda can, appear on a desk in the movie. A three-dimensional model of the object is uploaded or otherwise generated. The displayed image of the three-dimensional model is modified according to the determined movement of the camera.

While many of the embodiments discussed herein relate to advertisements, the present invention is in no way limited to advertisements. Indeed, the various algorithms can also be used to edit videos for a variety of purposes. The types of videos can also be other than feature films, such as home videos or professional videos of events.

In a movie, often the scene will cut from camera 1 to camera 2 then back to camera 1. Aspects of the present invention automatically identify cuts, and then "stitching" back the movie together to determine when the movie is cutting back to the same camera, so that if an advertisement is inserted into the first scene, it will automatically continue to be displayed whenever the movie cuts back to the same camera view.

Various embodiments described above, in connection with the figures, with the example verifications, proofs, algorithms and otherwise, may be implemented together. For example, the example algorithms and other description may be implemented in connection with one or more of the figures. One or more of the elements depicted in the drawings/figures can also be implemented in a more separated or integrated manner, or removed and/or rendered as inoperable in certain cases, as is useful in accordance with a particular application. It is also within the spirit and scope to implement a program or code that can be stored in a machine-readable medium to permit a computer to perform one or more aspects of the approaches described above. Other variations relate to the use of programmable logic and/or discrete logic to perform one or more of the functions discussed herein. In view of the description herein, those skilled in the art will recognize that many changes may be made thereto without departing from the spirit and scope of the present invention.

What is claimed is:

1. A method for generating video with embedded image content, said method comprising:
 receiving a selection input for a candidate location in a video frame of the video;
 tracking the candidate location in subsequent video frames of the video by approximating three-dimensional camera motion between two frames using a model that compensates for camera rotations, camera translations and zooming, statistically modeling three-dimensional camera motion between the video frames by estimating and using parameters of a transformation matrix that represents a projective transformation of images in the frame caused by movement of the camera, the projective transformation being based upon the composition of a pair of perspective projections of an image in the video frames, and optimizing the approximation using the statistical modeling; and embedding image content in the candidate location in the subsequent video frames of the video based upon the tracking thereof.

2. The method of claim 1, wherein the statistical modeling includes directed probabilities that a camera position is correct, the directed probabilities being directed from a previous video frame, a current video frame and a previous camera position.

3. The method of claim 1, wherein the statistical modeling includes directed probabilities that a camera position is correct, the directed probabilities being directed from a current video frame and at least one of a subsequent camera position and a subsequent video frame.

4. The method of claim 1, further including the steps of repeating the step of tracking the candidate location in subsequent video frames of the video at different video resolutions; and combining results of the tracking steps at different resolutions to determine the candidate location.

5. The method of claim 1, further including the steps of determining a mask for the embedded image content as a function of pixel differences between temporally disparate image frames, the pixels being located within the candidate location; and obscuring portions of the embedded image content in response to the determined mask.

6. The method of claim 1, further including the steps of matching an appearance of the subsequent video frames by blending one or more global scene properties onto the embedded image content and blending one or more local scene properties onto the embedded image content.

7. The method of claim 1, wherein the statistical modeling is based on machine learning and the projective transformation.

8. The method of claim 1, further including blending one or more global scene properties onto said image content and blending one or more local scene properties onto said image content.

9. The method of claim 1, wherein the step of approximating three-dimensional camera motion between two frames includes tracking scale-invariant feature transform features between video frames.

10. The method of claim 1, wherein tracking of the candidate location is implemented without prior knowledge of physical markers placed within the video images.

11. The method of claim 1, wherein the embedding image content is a video image-sequence.

12. The method of claim 1, wherein the image content is accessed from a remote file location that can be dynamically modified and wherein modified versions of the image content can be embedded using results of the tracked candidate location that are independent of the dynamic modification.

13. An apparatus comprising:
an electronic circuit configured and arranged to:
receive a selection input for a candidate location in a first video frame of the video;
track the candidate location in subsequent video frames of the video by
approximating three-dimensional camera motion between two frames,
statistically modeling the three-dimensional camera motion between the video frames by estimating and using parameters of a transformation matrix that represents a projective transformation of images in the first video frame caused by movement of the camera, the projective transformation being based upon the composition of a pair of perspective projections of an image in the video frames, and
optimizing the approximation using the statistical modeling of three-dimensional camera motion between video frames; and
embed image content in the candidate location in the subsequent video frames of the video.

14. The apparatus of claim 13, wherein the circuit is further configured and arranged to track users that view the video frames with embedded image content and track purchases made for goods or services advertised by the embedded image content.

15. The apparatus of claim 13, wherein the circuit is further configured and arranged to generate the projective transformation that updates the candidate location for a subsequent video frame, the generation including the steps of
initializing the projective transformation based upon a comparison of image features common to the first video frame and the subsequent video frame;
optimizing the projective transformation as a function of a normalized cross correlation and a relative deviation from the initial projective transformation;
increasing the resolution of the first video frame and the subsequent video frame; and
repeating the step of optimizing using the frames at the increased resolution.

16. The apparatus of claim 13, wherein the circuit is further configured and arranged to generate an occlusion mask by
correlating pixels in the first video frame and the subsequent video frame as a function of the tracked candidate location;
calculating, in a color space, a distance between the correlated pixels; and
determining occluded pixels based upon a threshold distance.

17. The apparatus of claim 13, further including a display circuit for providing a visual display of the video with the embedded image content.

18. A computer product comprising:
non-transitory computer readable medium storing instructions that when executed perform the steps of:
receiving a selection input for a candidate location in a video frame of a video;
tracking the candidate location in subsequent video frames of the video by
approximating three-dimensional camera motion between two frames using a model that compensates for camera rotations, camera translations and zooming,
statistically modeling three-dimensional camera motion between the video frames by estimating and using parameters of a transformation matrix that represents a projective transformation of images in the frame caused by movement of the camera, the projective transformation being based upon the composition of a pair of perspective projections of an image in the video frames, and optimizing the approximation using the statistical modeling of three-dimensional camera motion between video frames; and embedding image content in the candidate location in the subsequent video frames of the video based upon the tracking thereof.

19. The product of claim 18, wherein the computer readable medium further includes instructions for rendering the embedding image content by determining a mean and variance of color intensity in the candidate location without the embedded image content;

adjusting the color intensity of the embedded image content towards the determined mean and variance; and multiplicatively combining the luminosities of the embedded image content and in the candidate location without the embedded image content.

20. The product of claim 18, wherein the computer readable medium is a non-volatile memory circuit.

21. A method for generating video with embedded image content, the video including a plurality of temporally-arranged video frames captured by a camera, said method comprising:

receiving a selection input that identifies the position of a candidate location within a first one of the video frames;

tracking the position of the candidate location in video frames that are temporally subsequent to the first one of the video frames by generating approximation data that approximates three-dimensional motion of the camera between two of the video frames by compensating for rotation, translation and zooming of the camera, statistically modeling three-dimensional camera motion between the video frames by estimating and using parameters of a transformation matrix that represents a projective transformation of images in the frame caused by movement of the camera, the projective transformation being based upon the composition of a pair of perspective projections of an image in the video frames, modifying the approximation data based on the statistic modeling, and using the modified approximation data to determine the position of the candidate location in each of the subsequent video frames; and embedding image content in the determined position of the candidate location in the subsequent video frames.

* * * * *